United States Patent
Horev et al.

(10) Patent No.: US 12,183,332 B2
(45) Date of Patent: Dec. 31, 2024

(54) UNSUPERVISED AUTOMATED EXTRACTION OF CONVERSATION STRUCTURE FROM RECORDED CONVERSATIONS

(71) Applicant: GONG.IO LTD, Ramat Gan (IL)

(72) Inventors: Inbal Horev, Ra'anana (IL); Eilon Reshef, Tel Aviv (IL); Omri Allouche, Tel Aviv (IL); Yoav Madorsky, Tel Aviv (IL); Hanan Shteingart, Herzliya (IL)

(73) Assignee: GONG.IO LTD., Ramat Gan (IL)

( * ) Notice: Subject to any disclaimer, the term of this patent is extended or adjusted under 35 U.S.C. 154(b) by 0 days.

(21) Appl. No.: 18/310,558

(22) Filed: May 2, 2023

(65) Prior Publication Data

US 2023/0267927 A1 Aug. 24, 2023

Related U.S. Application Data

(63) Continuation of application No. 16/520,374, filed on Jul. 24, 2019.

(51) Int. Cl.
| | |
|---|---|
| *G10L 15/22* | (2006.01) |
| *G10L 15/04* | (2013.01) |
| *G10L 15/18* | (2013.01) |
| *G10L 15/197* | (2013.01) |
| *G06F 40/30* | (2020.01) |
| *G10L 15/183* | (2013.01) |

(52) U.S. Cl.
CPC ............ *G10L 15/197* (2013.01); *G10L 15/04* (2013.01); *G10L 15/18* (2013.01); *G10L 15/22* (2013.01); *G06F 40/30* (2020.01); *G10L 15/1815* (2013.01); *G10L 15/1822* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 7,487,094 B1* | 2/2009 | Konig | G10L 15/19 379/88.04 |
| 9,641,681 B2* | 5/2017 | Nuta | G10L 15/063 |
| 9,697,833 B2 | 7/2017 | Marcheret et al. | |
| 10,304,458 B1 | 5/2019 | Woo | |

(Continued)

OTHER PUBLICATIONS

Shafiei et al., "a statistical model for topic segmentation and clustering", Conference: Advances in Artificial Intelligence, 21st Conference of the Canadian Society for Computational Studies of Intelligence, Canadian AI 2008, Windsor, Canada, May 28-30, 2008, Proceedings pp. 283-293. (Year: 2008).*

(Continued)

*Primary Examiner* — Richard Z Zhu
(74) *Attorney, Agent, or Firm* — MEITAR PATENTS LTD.

(57) ABSTRACT

A method for information processing includes computing, over a corpus of conversations, a conversation structure model including (i) a sequence of conversation parts having a defined order, and (ii) a probabilistic model defining each of the conversation parts. For a given conversation, a segmentation of the conversation is computed based on the computed conversation structure model. Action is taken on the given conversation according to the segmentation.

21 Claims, 3 Drawing Sheets

(56) References Cited

U.S. PATENT DOCUMENTS

| | | | |
|---|---|---|---|
| 10,497,382 B2 | 12/2019 | Chaudhuri et al. | |
| 10,515,292 B2 | 12/2019 | Harwath et al. | |
| 10,706,873 B2 | 7/2020 | Tsiartas et al. | |
| 2011/0258188 A1* | 10/2011 | AbdAlmageed | G06F 16/7844 |
| | | | 707/E17.058 |
| 2015/0058004 A1 | 2/2015 | Dimitriadis et al. | |
| 2015/0261745 A1 | 9/2015 | Song et al. | |
| 2016/0110343 A1* | 4/2016 | Kumar Rangarajan Sridhar | G06F 40/216 |
| | | | 704/9 |
| 2016/0217793 A1 | 7/2016 | Gorodetski et al. | |
| 2018/0067558 A1 | 3/2018 | Eagleman et al. | |
| 2020/0143288 A1* | 5/2020 | Eisenzopf | G06F 40/30 |
| 2020/0250269 A1* | 8/2020 | Koseki | G06N 3/045 |

OTHER PUBLICATIONS

EP Application # 20184576.5 Office Action dated Mar. 31, 2023.
IBM, "What is Unsupervised Learning?" Newsletter, pp. 1-10, last updated Apr. 8, 2023.
Kwon et al., "Clustervision: Visual Supervision of Unsupervised Clustering," IEEE Transaction on Visualization and Computer Graphics, vol. 24, No. 1, pp. 142-151, Jan. 2018.
EP Application # 20184576.5 Summons to Attend Oral Proceedings dated Nov. 13, 2023.
U.S. Appl. No. 17/588,296 Office Action dated Mar. 6, 2024.

\* cited by examiner

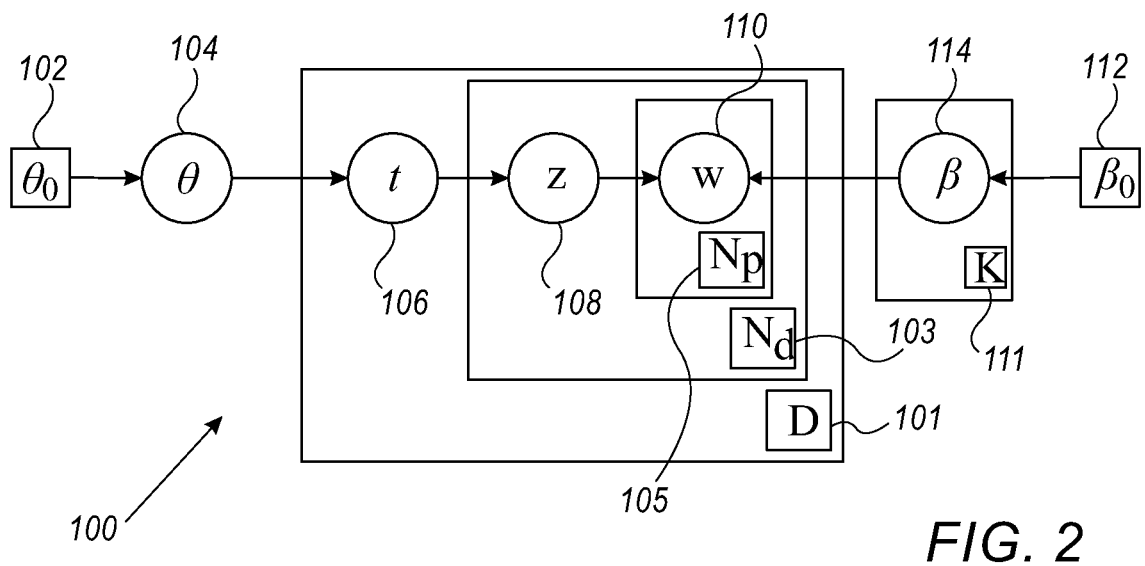
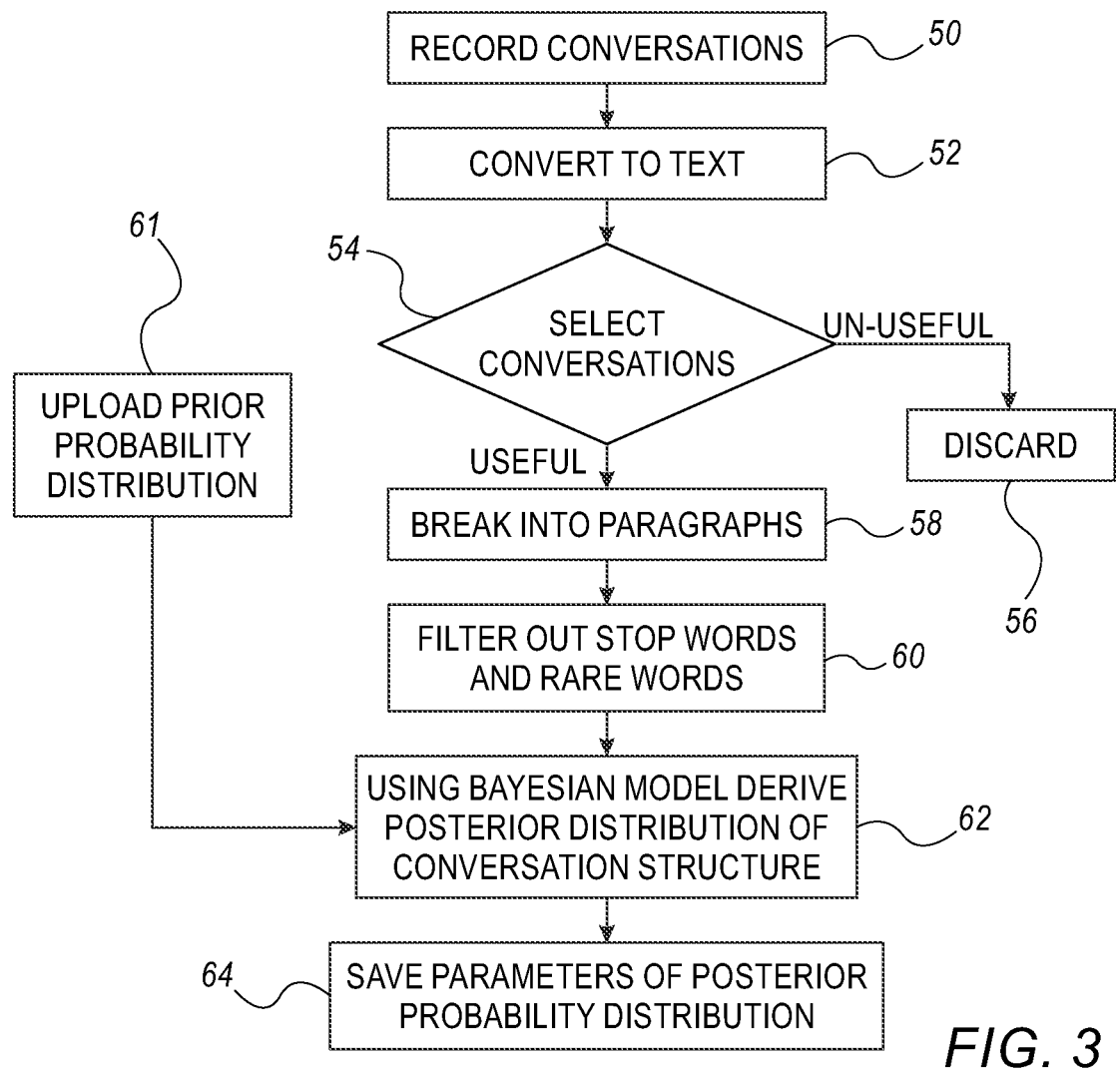
FIG. 2
FIG. 3

UNSUPERVISED AUTOMATED EXTRACTION OF CONVERSATION STRUCTURE FROM RECORDED CONVERSATIONS

CROSS-REFERENCE TO RELATED APPLICATION

This application is a Continuation Patent Application of commonly owned U.S. patent application Ser. No. 16/520,374, entitled: Unsupervised Automated Extraction Of Conversation Structure From Recorded Conversations, filed on Jul. 24, 2019, the disclosure of which is incorporated by reference in its entirety herein.

FIELD OF THE INVENTION

The present invention relates generally to natural language processing, and particularly to techniques for analyzing the content of conversations.

BACKGROUND

Vast amounts of information are exchanged among participants in teleconferences. In many organizations, teleconferences are recorded and available for subsequent review. Even when the teleconferences are transcribed to textual form, however, reviewing the records is so time-consuming that the vast majority of the information cannot be exploited.

A number of methods have been proposed in the patent literature for automating the extraction of information from teleconferences. For example, U.S. Pat. No. 8,214,242 describes signaling correspondence between a meeting agenda and a meeting discussion that includes, receiving a meeting agenda specifying one or more topics for a meeting; analyzing, for each topic, one or more documents to identify topic keywords for that topic; receiving meeting discussions among participants for the meeting; identifying a current topic for the meeting dependent upon the meeting agenda; determining a correspondence indicator dependent upon the meeting discussions and the topic keywords for the current topic, the correspondence indicator specifying the correspondence between the meeting agenda and the meeting discussion; and rendering the correspondence indicator to the participants of the meeting.

As another example, PCT Application Publication No. WO 2019/016119 describes a method and a system for performing automatically a discovery of topics within temporal ordered text document collections, the method comprising the steps of: generating a bag of words vector for each text document collection using a predefined dictionary, iteratively calculating on the basis of the generated bag of words vectors, for each text document collection, a hidden topic vector, representing topics of the respective text document collection using a calculated hidden state vector, and memorizing a hidden state of all previous text document collections.

SUMMARY OF THE INVENTION

An embodiment of the present invention provides a method for information processing, including computing, over a corpus of conversations, a conversation structure model including: (i) a sequence of conversation parts having a defined order, and (ii) a probabilistic model defining each of the conversation parts. For a given conversation, a segmentation of the conversation is computed based on the computed conversation structure model. Action is taken on the given conversation according to the segmentation.

In some embodiments, computing the probabilistic model includes assigning a probability to an occurrence of each word.

In some embodiments, assigning the probability includes running a Gibbs sampling process.

In an embodiment, assigning the probability includes using a prior probability distribution for one or more of the conversation parts.

In another embodiment, computing the conversation structure model includes pre-specifying a fixed number of the conversation parts.

In some embodiments, computing the conversation structure model includes selecting a subset of the conversations based on one or more business rules.

In some embodiments, computing the segmentation of the conversation includes finding the segmentation that best matches the conversation structure model.

In an embodiment, the method further includes computing a coherence score, which quantifies an extent of fit between the given conversation and the conversation structure model.

In another embodiment, the method further includes, when the coherence score is below a given value, regarding the given conversation as not matching the conversation structure model.

In some embodiments, estimating the coherence score includes analyzing a likelihood of the segmentation of the conversation under the conversation structure model. In other embodiments, the method further includes deciding, based on one or more coherence scores computed between one or more respective conversations in the corpus and the conversation structure model, that the conversation structure model does not capture a valid conversation structure.

In an embodiment, the method further includes, subsequent to computing the conversation structure model, merging one or more of the conversation parts into a single conversation part.

In some embodiments, the conversations are transcribed from human conversations.

In some embodiments, the conversations are recorded conversations, conducted over a telephone, a conference system, or in a meeting.

In an embodiment, acting on the given conversation includes presenting a timeline that graphically illustrates the respective order and durations of the conversation parts during the given conversation. In another embodiment, acting on the given conversation includes displaying conversation part duration to computer users.

In some embodiments, the method further includes searching for words within a conversation or within the corpus based on a conversation part to which the words are assigned. In other embodiments, the method further includes correlating the conversation parts of a given participant with participant metadata to identify conversation differences between participants.

There is additionally provided, in accordance with an embodiment of the present invention a system for information processing, including an interface and a processor. The interface is configured for accessing a corpus of recorded conversations. The processor is configured to: (a) compute, over a corpus of conversations, a conversation structure model, including (i) a sequence of conversation parts having a defined order, and (ii) a probabilistic model defining each of the conversation parts, (b) compute, for a given conversation, a segmentation of the conversation based on the computed conversation structure model, and (c) act on the given conversation according to the segmentation.

There is further provided, in accordance with an embodiment of the present invention a computer software product, the product including a tangible non-transitory computer-readable medium in which program instructions are stored, which instructions, when read by a processor, cause the processor to: (a) compute, over a corpus of conversations, a conversation structure model including (i) a sequence of conversation parts having a defined order, and (ii) a probabilistic model defining each of the conversation parts, (b) compute, for a given conversation, a segmentation of the conversation based on the computed conversation structure model, and (c) act on the given conversation according to the segmentation. The present invention will be more fully understood from the following detailed description of the embodiments thereof, taken together with the drawings in which:

BRIEF DESCRIPTION OF THE DRAWINGS

FIG. 2 is a plate diagram that schematically describes a Bayesian model for unsupervised extraction of a conversation structure model from a corpus of conversations, in accordance with an embodiment of the invention;

FIG. 3 is a flow chart that schematically illustrates a method for unsupervised extraction of a conversation structure from a corpus of conversations, in accordance with an embodiment of the invention;

DETAILED DESCRIPTION OF EMBODIMENTS

Overview

Figure 1:
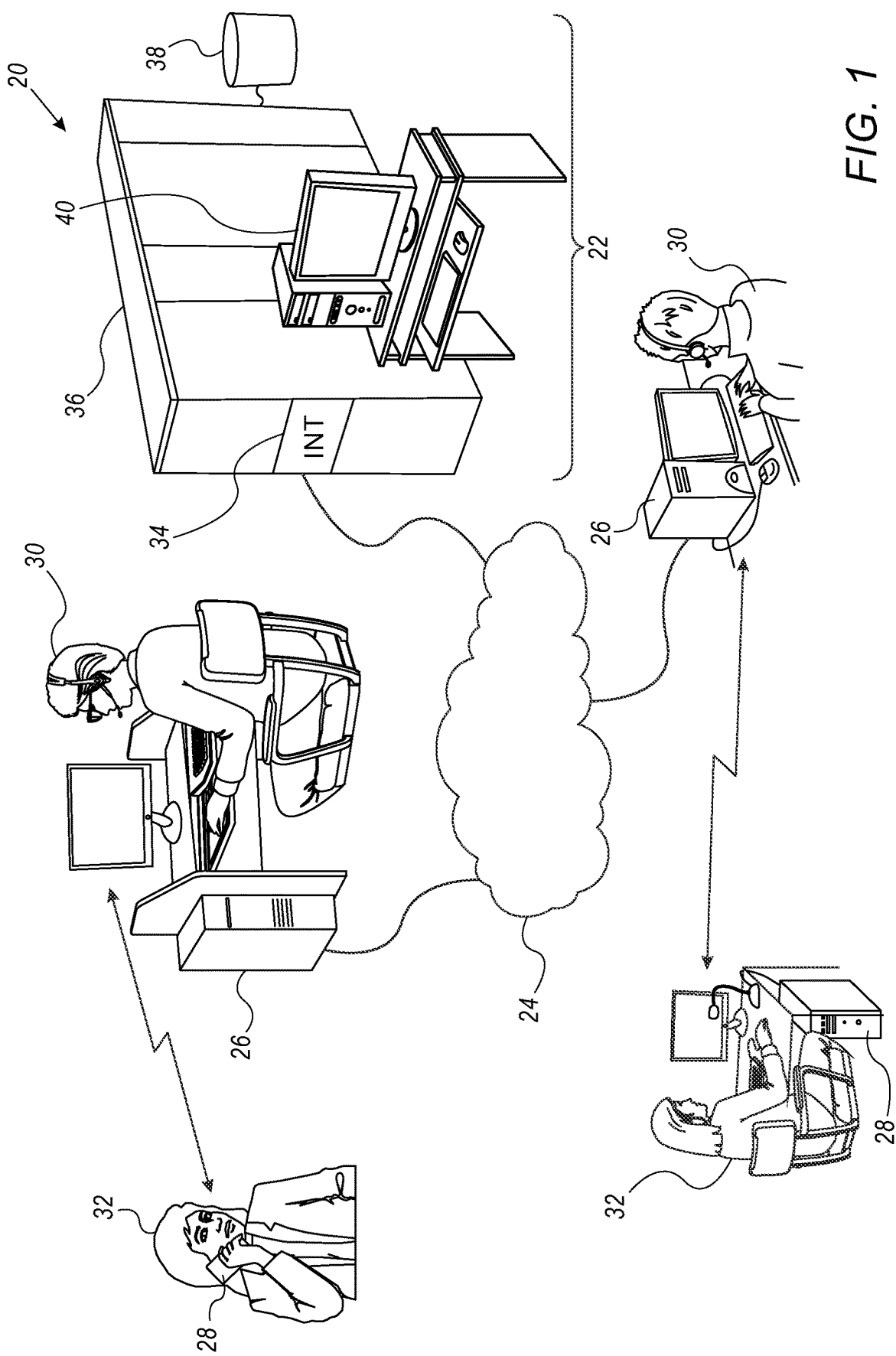
FIG. 1 is a schematic pictorial illustration of a teleconferencing system, in accordance with an embodiment of the invention.

Embodiments of the present invention that are described hereinafter provide methods and systems that are capable of autonomously analyzing an input corpus of recorded conversations between two or more speakers, such as telephone conversations, and identifying a common conversation structure across the conversations. The present embodiments are particularly useful in analyzing recorded teleconferences, with two or more speakers participating in each conversation. However, the principles of the present invention may similarly be applied to substantially any large corpus of text documents or recorded conversations. Any and all such items are regarded herein as "conversations."

In the context of the present disclosure and in the claims, the term "conversation structure" means a list of conversation intervals, typically comprising sentences uttered by a single speaker continuously, which have respective common characteristics and which appear in a specific order. The intervals are referred to herein as "conversation parts." For example, a conversation structure model may consist of an ordered set of conversation parts titled "Introduction", "Follow-up", and "Summary".

Although each conversation part typically consists of a single semantic topic, for the purpose of determining a structure model there is no need to specify the topic of each conversation part explicitly.

Given an input conversation (e.g., one of the conversations in the corpus or a new relevant conversation), the disclosed methods and systems can further estimate the extent to which that conversation matches (e.g., complies with) the common structure model that the system has identified. For example, the system may assess to what degree the order of topics was maintained, such as Introduction, Follow-up, and Summary. Assessing the compliance to a common conversation model is useful in various real-life applications, such as training or evaluation of sales persons and customer support representatives.

While the following description refers mainly to a single common structure, the disclosed techniques also apply to identifying multiple common structures across a corpus of conversation and estimating the extent to which a given conversation matches (e.g., complies with) one or more of the common structures.

In some disclosed embodiments, a computerized conversation processing system comprises an interface for accessing a corpus of recorded conversations, and a processor. The processor computes, over the conversations in the corpus, a conversation structure model comprising (i) a sequence of parts having a defined order, and (ii) a probabilistic model defining each of the conversation parts. Then, for a given conversation, the processor computes a segmentation of the conversation based on the computed structure model. Subsequently, the processor acts on the given conversation according to the segmentation.

In some embodiments, the processor computes the conversation structure model by adapting a predefined set of a-priori occurrence probabilities to reflect actual occurrence probabilities computed over the corpus. The prior probability distribution is over a pre-specified fixed number of ordered and non-recurring conversation parts and over the word occurrences in each part. In some embodiments, the processor computes a posterior probability distribution by: (a) dividing each recorded conversation into an ordered set of paragraphs, (b) computing, by the processor, respective frequencies of occurrence of multiple words in each of a plurality of paragraphs in each of the recorded conversations, (c) based on the frequency of occurrence of the words over the conversations in the corpus and the prior probabilities of the words and conversation parts, running a Gibbs sampling process, and (d) outputting the parameters of the posterior probability distribution obtained by the Gibbs sampler.

Given the structure model, the processor then computes the segmentation of the conversation by finding the segmentation that has the best match to the computed model.

In some embodiments, the processor computes s a coherence score between a given conversation and the structure model, which quantifies an extent of fit between the given conversation and the conversation structure model. In an embodiment, the processor is further configured to, when the coherence score is below a given value, regard the given conversation as not matching the conversation structure model. The processor estimates the coherence score by analyzing a likelihood of the segmentation of the conversation under the conversation structure model.

A conversation with too low of a coherence score, determined based on the disclosed technique, may be flagged or dropped from a displaying process of the analyzed agendas. Based on the coherence score for the conversation structure, a user of the system is able to understand how well the conversation was devoted to peruse the most common (i.e., learned) structure.

System Description

FIG. 1 is a schematic pictorial illustration of a teleconferencing system 20, in accordance with an embodiment of the invention.

A server 22 receives and records conversations via a network 24. Server 22 may receive audio input from the conversations online in real time, or it may receive recordings made and stored by other means, such as by processors 26, or even textual transcripts of conversations, created by speech-to-text programs running on other processors. As one example, server 22 may collect recordings of Web conferences using the methods described in U.S. Pat. No. 9,699,409, whose disclosure is incorporated herein by reference.

In the pictured embodiment, server 22 collects and analyzes conversations made by people working in a given field, for example, help desk personnel or sales agents working for a given company. In the disclosed example, sales agents 30, using processors 26, communicate with customers 32 who use audio devices 28. These conversations may be carried out over substantially any sort of network, including both telephone and packet networks. Although the conversations shown in FIG. 1 have two participants, server 22 may similarly apply the techniques described herein in analyzing conversations between three or more participants. In an embodiment, a processor correlates the conversation parts of a given participant with participant metadata to identify conversation differences between participants.

Server 22 comprises a computerized conversation processing system including a processor 36 that may be a general-purpose computer, which is connected to network 24 by a network interface 34. Server 22 receives and stores the corpus of recorded conversations in memory 38 for processing by processor 36. Processor 36 autonomously derives an optimal conversation structure of K parts (i.e., optimal conversation structure) and, at the conclusion of this process, processor 36 is able to present the conversation structure over the entire duration of the recorded conversations on a display 40. Given a new conversation, processor 36 can extract the new conversation structure and, based on the previously learned conversation structure model, assign to the newly extracted structure a coherence score reflecting how well it fits this model. Processor 36 may then present the given coherence score on display 40.

Processor 36 typically carries out the functions that are described herein under the control of program instructions in software. This software may be downloaded to server 22 in electronic form, for example over a network. Additionally, or alternatively, the software may be provided and/or stored on tangible, non-transitory computer-readable media, such as optical, magnetic, or electronic memory media. In particular, processor 36 runs a dedicated algorithm as disclosed herein, including in FIG. 2, that enables processor 36 to perform the disclosed steps, as further described below.

Constrained Bayesian Model for Conversation Structure Extraction

Introduction

In the disclosed embodiments, a processor of the computerized conversation processing system first sets a conversation structure model comprising an ordered sequence of a pre-specified number K of conversation parts. Each of the K implicit parts appears only once in the conversation (i.e., is non-recurring). Furthermore, the conversation parts are identified by a unique qualifier (e.g., a running index). Specifically, the conversation parts must appear in the same order (although not all K parts must appear in all conversations). The total number K of the conversation parts can be defined in advance to be any suitable target number, for example a chosen number between five and ten.

Each part of the structure model is given as a prior distribution of its word occurrences and a prior distribution of its duration in a conversation.

Subsequently, the system autonomously processes the contents of an input corpus of recorded conversations that are assumed to have a common content-structure made up of these K parts. In some embodiments, the disclosed system converts the recorded conversations into text using any suitable methods and tools. Following conversion to text, and optionally filtering out irrelevant conversations, the system breaks the entire conversation into an ordered collection of textual units referred to hereinafter as paragraphs made of sentences uttered by the same speaker continuously. The processor then computes respective frequencies of occurrence of multiple words in each of a plurality of paragraphs in each of the recorded conversations.

The system uses the prior probability of the conversation structure model, the frequency of word occurrences in the input corpus and a suitable machine learning algorithm, such as a Gibbs sampling process, to calculate a posterior probability distribution of the K parts across the entire corpus. The system outputs the parameters of the learned probability for further use, such as the analysis of specific recorded conversations, as described below.

Given one of the conversations in the corpus, or a new relevant conversation as an input, the conversation structure estimation proceeds autonomously in the same manner, without supervision, human to determine a segmentation of that conversation that has the highest likelihood under the learned probability distribution of the structure model, as described below.

In an embodiment, each conversation admits a segmentation given the words such a conversation contains. The structure model dictates that the length of any particular conversation part $K_i$ of the K conversation parts, i=1, 2 ... $K_i$ is multinomially distributed with a mean length of $\vartheta_{Kj}$ paragraphs. In an embodiment, a specific conversation, d, can admit a segmentation where conversation part $K_i$ of that conversation, $K_{i,d}$, is any number of paragraphs long, $t_{Ki, d}$. The likelihood of the segmentation decreases as the number of paragraphs $t_{Ki, d}$ differs from the learned mean number of paragraphs $\vartheta_{Kj}$ and when the words in this conversation part are very different from a learned multinomial word distribution, w~Multinomial $(\beta)$, that is based on a given dictionary of words, $\beta_0$, as described below.

DETAILED DESCRIPTION

FIG. 2 is a plate diagram 100 schematically describing a Bayesian model 100 for unsupervised estimation of a conversation structure model from a corpus of recorded conversations, in accordance with an embodiment of the invention.

The method imposes a probability distribution of an ordered sequence of conversation parts, further described below, on the conversations that is determined (e.g., learned) by a generative process that the method associates with the corpus of conversations. In an embodiment, the probability distribution of the ordered sequence of conversation parts (i.e., the learned probability) is a combination of the multinomial distribution the conversation part assignments and a multinomial distribution over the words in each paragraph. Typically, a subsequent conversation part distribution of a specific conversation cannot be reduced to a single multinomial distribution.

In the model, the corpus contains a number D of conversations. The disclosed model assumes any conversation structure is made of a number K of ordered different yet-unidentified conversation parts, where the order of conversation parts is maintained for all conversations. Some of the conversation parts, though, may be absent in a given conversation.

Each conversation d of the D (101) conversations is assumed by the model to be made of paragraphs, where the model imposes a probability distribution θ (104), such as a multinomial distribution, on the count of paragraphs assigned to each of the K (111) ordered different conversation parts. This probability distribution is either set in advance or itself drawn from a prior $θ_0$ (102). In the shown embodiment:

$$t_d \sim \text{Multinomial}(θ) \qquad \text{Eq. 1}$$

a vector $t_d$ (106) gives paragraph counts in a conversation d, where $t_d=\{(np_1, np_2, \ldots np_K)\}$, and $(np_1, np_2, \ldots np_K)$ is multinomially distributed according to parameters $\vartheta 0$ and $np_i$ are paragraph counts per conversation parts i, i=1, 2 ... K.

The vector of paragraph assignments, $z_d$ (108), is given by the unpacked vector ta ordered by the specified conversation part ordering, where paragraph j belongs to conversation part i, i=1, 2 ... K.

According to the Bayesian model of FIG. 2, the distribution of words in a paragraph p of a conversation d, $W_{p,d}$, are drawn from a language model $β_i$ (114) where $i=z_{d,p}$. The language model is based on a given prior, $β_0$, (112) on the distribution of words. As noted above, the disclosed model enforces conversation part coherence (i.e., uniqueness) for an entire paragraph.

At training time, the model implicitly estimates the joint marginal distribution P(t|w), the probability of the conversation part assignments given the document text. Several methods exist to estimate this posterior probability, one of which is Gibbs sampling. Gibbs sampling is a Markov chain Monte Carlo (MCMC) algorithm for obtaining a sequence of observations which are drawn from a specified multivariate probability distribution, when direct sampling is difficult. This sampled sequence is in turn used to approximate the joint and marginal distributions of the learned probability. The derivation of the learned probability comprises extracting the probability of the ordered sequence of conversation parts from the conversations by the processor without using a pre-classified training set.

At inference time an optimal segmentation for each conversation is computed, in the sense that it maximizes the likelihood that the paragraphs are generated by the conversation structure model.

The expression for the joint marginal probability used in the Gibbs sampling is given in Eq. 2. The notation $w_{-d}$ signifies the word frequencies in all but the $d_{th}$ conversation, respectively $t_{-(d,i)}$ is the vector of conversation parts assignment counts in all but the $i_{th}$ paragraph of conversation.

$$P(w_d) \propto \qquad \text{Eq. 2}$$
$$P(t_{-(d,i)}, θ_0)P(t_d, w_{-d}, z_{-d}, β_0) \propto \left[\frac{N(t_{-(d,i)}, t) + θ_0}{|t_{-(d,i)}| + Kθ_0}\right] P(z, w_{-d}, β_0)$$

in which w (110) is conversation words, $β_0$ is language model parameters of each of the model parts, $N_p$ (105) is number of words in paragraph p, and $N_d$ (103) is the number of paragraphs in the conversation (document) d.

The model assigns a multinomial distribution for each paragraph p in conversation d, and for each word w in paragraph p:

$$w_d \sim \text{Multinomial}(β[z_{d,p}]) \qquad \text{Eq. 3}$$

Given a relevant conversation $d_0$, such as one belonging to the D (101) conversations, and using Eq. 3, the disclosed technique can determine agenda structure segmentation of K conversation parts of that conversation having the highest likelihood $L(z_{d0}|w_{d0})$. The conversation parts structure which obtains the maximum likelihood has no closed form but can be found by applying, for example, a message passing algorithm.

Deriving Probability Distribution of Ordered Sequence of Conversation Parts

FIG. 3 is a flow chart that schematically illustrates a method for unsupervised estimation of a conversation structure from a corpus of conversations, in accordance with an embodiment of the invention.

In the description that follows, this method, as well as the other methods described below, is assumed to be carried out by server 22, but these methods may alternatively be implemented in any other suitable processing configurations. All such implementations are considered to be within the scope of the present invention.

To initiate the method of FIG. 3, server 22 records a corpus of conversations in memory 38, at a recording step 50. The conversations in the corpus are assumed to belong to a certain shared domain, such as sales conversations between agents 30 and customers 32 in the example shown in FIG. 1, so that there will be a commonality of conversation parts among the conversations. If the recorded conversations are not already in textual form, processor 36 converts the oral conversation streams to text, at a speech-to-text conversion step 52. Any suitable sort of speech processing program may be used for this purpose.

In some embodiments, processor 36 selects the recorded conversations based on business rules, e.g., processor 36 acts only on the first conversation of every sales opportunity, at conversations selection step 54. Next, at a discard step 56, processor 36 drops non-useful conversations, such as described below.

In some embodiments, processor 36 filters out the un-useful recorded conversations by testing language and/or syntax. This step can be important in the unsupervised learning process of FIG. 2 in eliminating spurious conversations that might otherwise impair the precision of classification. For example, processor 36 excludes from computation of the conversation structure any conversations in which the analyzed syntax does not match the target language, at a discard step 56.

To begin the actual conversation structure estimation process, processor 36 breaks the conversations into paragraphs, at a paragraph division step 58. A paragraph is a continuous series of words of a selected length, or within a selected length range uttered by a single speaker. The inventors have found that it is helpful to use a paragraph size on the order of three sentences, at step 58. Other considerations may also be applied in choosing paragraph boundaries, such as pauses in the conversation. However, other definitions of a paragraph may be applied.

As another preliminary step, it is also useful for processor 36 to filter out of the conversation transcripts certain types of words, such as stop words and rare words, at a word filtering step 60. "Stop words" is a term used in natural language processing to denote words that have little or no semantic meaning. The inventors have found it useful in this regard to filter out roughly one hundred of the most common English words, including "a", "able", "about", "across", "after", "all", "almost", etc. Because such stop words have a roughly equal chance of appearing in any conversation part, removing them from the paragraphs can be helpful in speeding up subsequent conversation part estimation.

Processor 36 counts the number of occurrences of the remaining words in each of the paragraphs and in the corpus as a whole. Absent human supervision, words that appear only once or a few times (for example, less than four times) in the corpus cannot reliably be associated with a conversation part. Therefore, processor 36 eliminates these rare words, as well, at step 60 in order to speed up the conversation part estimation.

Processor 36 sets in advance, or uploads from a memory, a prior probability of an ordered sequence of K conversation parts, at a prior probability uploading step 61. Using a Bayesian model, such as the model described in FIG. 2, and a Gibbs sampling process processor 36 derives the posterior probability of the ordered sequence of conversation parts, i.e., of the duration of each of the K conversation parts as well as its distribution of words in each conversation part, at probability distribution derivation step 62. In the inventors' experience, a number K of 5-10 conversation parts is a useful target for analysis of corpora containing hundreds of conversations in a particular domain. Step 62 can be carried out using any suitable Bayesian estimation tools.

Finally, at a storage step 64, the processor stores the parameters of the probability distribution (i.e., of $\beta$ and $\vartheta$) of the learned model.

Figure 4:
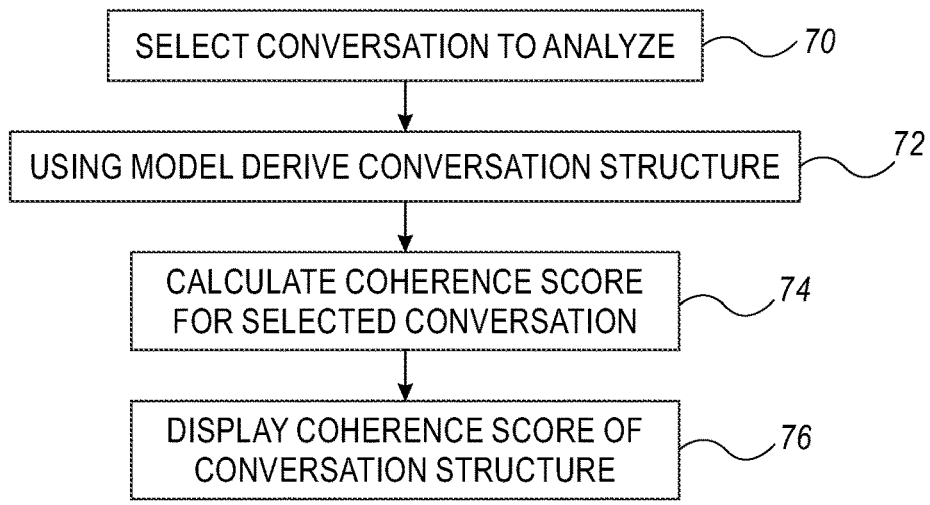
FIG. 4 is a flow chart that schematically illustrates a method for analyzing and assigning a coherence score to a conversation, in accordance with an embodiment of the invention.

FIG. 4 is a flow chart that schematically illustrates a method for analyzing and assigning a coherence score to a conversation, in accordance with an embodiment of the invention. Processor 36 applies the model described in FIG. 2 to analyze the conversation, using the parameters of the learned model in step 62. The model is used to find the maximal likelihood segmentation for the conversation (e.g., phone call) and this optimal segmentation is given a coherence score. To initiate this method, processor 36 selects a conversation to analyze, at a conversation selection step 70. The conversation may be selected from the same corpus as was used previously in learning the conversation parts, as described above, or it may be a newly collected conversation.

Using the procedure described in FIG. 3, processor 36 calculates the maximal likelihood segmentation ($S_{d0}$) for the conversation $d_0$, at a given conversation structure derivation step 72. The set of K conversation parts count vector, $z_{d0}$, is the "optimal" vector in the sense that it maximizes the likelihood $q(w_{d0})$ that the paragraphs and the words in each paragraph can be generated by the machine-learned conversation part structure.

Processor 36 then calculates a coherence score, at a coherence scoring step 74. The coherence score is calculated using a function that accepts as an input the probabilities of each paragraph to belong to each of the conversation parts, as well as the optimal segmentation estimated by the algorithm. It outputs a score based on the ratio between the paragraph probability under the most probable conversation part and the actual chosen conversation part. The score typically ranges between very poor and excellent and/or an equivalent numerical score between zero and a hundred. Processor 36 presents the coherence scoring of the conversation on display 40, at an output step 76.

Figure 5:
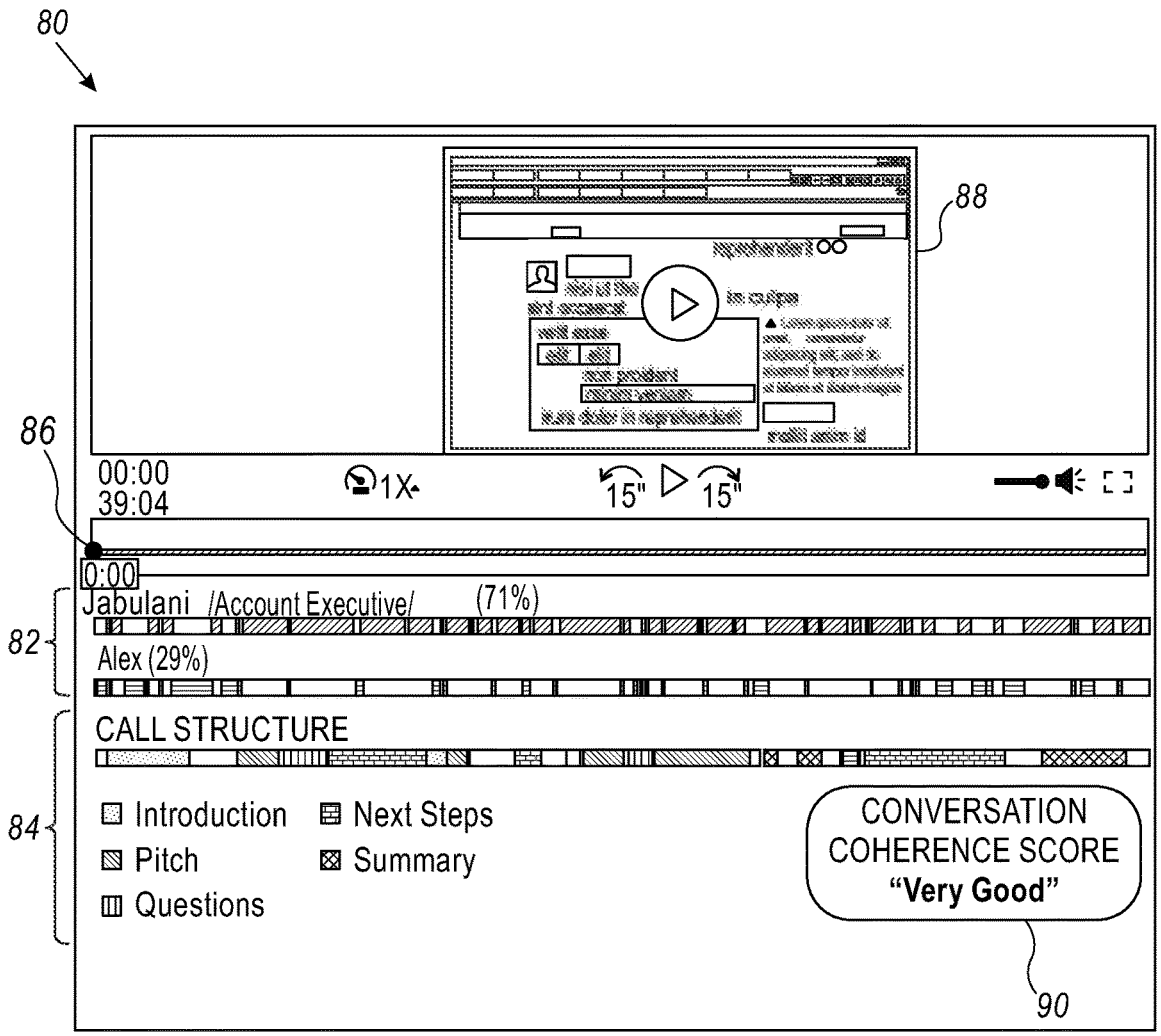
FIG. 5 is a schematic representation of a computer screen, showing a graphical analysis of a recorded conversation, in accordance with an embodiment of the invention.

FIG. 5 is a schematic representation of a computer screen 80, showing a graphical analysis of a recorded conversation, in accordance with an embodiment of the invention.

Processor 36 presents the results of analysis of the conversation on display 40, at an output step 76. The display may show the segmentation of the conversation.

Using further analysis tools, such as those described in U.S. Patent Application Publication 2018/0239822, which issued as U.S. Pat. No. 10,642,889, processor 36 may present the results of such an analysis of the conversation on display 40. The display shows the segmentation of the conversation.

This figure shows an example of a user interface screen, illustrating how a typical conversation has been segmented by conversation part at step 74 and presented at step 76 for subsequent review by the user.

Horizontal bars 82, labeled "Jabulani" and "Alex" (an account executive and a customer, for example), show which of these two parties to the conversation was speaking at each given moment during the conversation. A "Conversation parts" bar 84 shows the conversation part at each corresponding moment during the conversation. The conversation parts are color-coded, according to the legend appearing at the bottom of screen 80.

The user who is viewing screen 80 can browse through the conversation using a cursor 86. For example, to look into how pricing was negotiated between Jabulani and Alex, the user can move the cursor horizontally to one of the conversation parts labeled with the title "Introduction" and then listen to, or read, the text of the conversation in this conversation part. Optionally, the user can also view a screenshot 88 of Jabulani's computer screen at each point in the conversation.

The conversation structure estimation process may then output a coherence score 90 for the maximal likelihood segmentation, that measures the extent to which the derived conversation structure fits the constrained learned probability.

Use of Segmentation Results in Analytics and Prediction

The results of the sort of segmentation of conversations that is described above can be used in analyzing certain qualities of a conversation and possibly to predict its outcome. For example, the location and distribution of conversation parts can be used to assess whether the conversation is following a certain desired agenda. Additionally, or alternatively, the location and distribution of conversation parts can be used to predict whether the conversation is likely to result in a desired business outcome.

For such purposes, processor 36 (or another processor, which receives the segmentation results) uses the conversation part location, distribution, and related statistics, such as the duration of a given conversation part, the time of its occurrence in a conversation, to predict the expected likelihood that a conversation belongs to a certain group. An example of useful groups of this sort are conversations resulting in a desired business outcome, conversations managed by top-performing sales representative, conversations marked as good conversations by team members, or conversations following a desired pattern.

Based on these predictions, processor 36 provides insights and actionable recommendations for improving the sales process, for both the entire sales organization and for specific sales people or teams.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for processing a conversation, the method comprising:
   creating a conversation structure model from a corpus of conversations, the conversation structure model including a fixed number of conversation parts arranged in an ordered sequence having a defined order, such that the conversation parts are constrained to appear in the defined order; and
   applying a given conversation to the conversation structure model by enforcing the conversation structure model on the given conversation to output the given conversation in accordance with the conversation structure model, the enforcing comprising:
      analyzing word distributions in the given conversation to best fit each of the conversation parts and the ordered sequence of the conversation parts of the conversation structure model; and
      based on the analysis, outputting the given conversation in segments corresponding to the fixed number of conversation parts of the conversation structure model, with the segments ordered in a sequence corresponding to the ordered sequence of the conversation parts in the conversation structure model,
      wherein the conversation structure model is constrained such that each of the conversation parts appears no more than once in the given conversation.

2. The method of claim 1, wherein the fixed number of conversation parts includes two or more.

3. The method of claim 2, the method additionally comprising: analyzing each of the segments of the given conversation against the corresponding conversation part of the conversation structure model to determine a coherence for the given conversation.

4. A computer-implemented method for processing a conversation, the computer-implemented method comprising:
   accessing, by one or more processors, a conversation structure model trained from a corpus of conversations, the conversation structure model including a fixed number of conversation parts arranged in an ordered sequence having a defined order, such that the conversation parts are constrained to appear in the defined order;
   deploying the trained model by the one or more processors;
   inputting a given conversation comprising words into the conversation structure model; and
   enforcing the conversation structure model on the given conversation to output the given conversation as segmented conversation formed segments, the segmented conversation formed segments being created based on analyzing the words from the given conversation, the number of the segmented conversation formed segments corresponding to the number of conversation parts of the conversation structure model, with the segmented conversation formed segments ordered in a sequence corresponding to the ordered sequence of the conversation parts in the conversation structure model,
   wherein the conversation structure model is constrained such that each of the conversation parts appears no more than once in the given conversation.

5. The computer-implemented method of claim 4, wherein the analyzing the words from the given conversation comprises analyzing the words based on word distributions.

6. A computer-implemented method for processing a conversation, the computer-implemented method comprising:
   accessing, by one or more processors, a conversation structure model having been trained based on: 1) collected word occurrence probabilities from conversations in a corpus of conversations to form conversation parts, and 2) collected sequences of conversation parts from the conversations from the corpus of conversations, the conversation structure model being an optimal conversation including a predetermined number of conversation parts, each of the conversation parts arranged in an ordered sequence having a defined order, such that the conversation parts are constrained to appear in the defined order;
   deploying the conversation structure model by the one or more processors;
   inputting a given conversation comprising words into the conversation structure model; and
   enforcing the conversation structure model on the given conversation to output the given conversation as segmented conversation formed segments, the segmented conversation formed segments being created based on analyzing word distributions of the words from the given conversation, the number of the segmented conversation formed segments corresponding to the number of conversation parts of the conversation structure model, with the segmented conversation formed segments ordered in a sequence corresponding to the ordered sequence of the conversation parts in the conversation structure model,
   wherein the conversation structure model is constrained such that each of the conversation parts appears no more than once in the given conversation.

7. The computer-implemented method of claim 6, wherein the number of conversation parts includes a plurality of conversation parts.

8. A system for conversation processing, the system comprising:
   a memory of a computer, the memory configured for storing a conversation structure model:
   the conversation structure model having been built based on a corpus of conversations, and
   the conversation structure model including a fixed number of conversation parts arranged in an ordered sequence having a defined order, such that the conversation parts are constrained to appear in the defined order; and
   one or more processors configured to:
      deploy the conversation structure model stored in the memory;
      obtain a given conversation; and
      apply the given conversation to the conversation structure model including enforcing the conversation structure of the conversation structure model on the given conversation to output the given conversation in accordance with the conversation structure model, the enforcing comprising:
analyzing the word distributions in the given conversation to best fit each of the conversation parts and the ordered sequence of the conversation parts of the conversation structure model; and
based on the analysis, outputting the given conversation in segments corresponding to the fixed number of conversation parts of the conversation structure model, with the segments ordered in a sequence corresponding to the ordered sequence of the conversation parts in the conversation structure model,
wherein the conversation structure model is constrained such that each of the conversation parts appears no more than once in the given conversation.

9. The system of claim 8, wherein the fixed number of conversation parts includes two or more.

10. The system of claim 8, wherein the enforcing additionally comprises: analyzing each of the segments of given the conversation the corresponding against conversation part of the conversation structure model to determine a coherence for the given conversation.

11. The system of claim 8, wherein the fixed number of conversation parts arranged in an ordered sequence is obtained from an extraction of the conversation parts of the corpus.

12. The system of claim 8, wherein the conversation structure model includes a trained conversation structure model.

13. A system for conversation processing, the system comprising:
a memory of a computer, the memory configured for storing a conversation structure model;
the conversation structure model having been built from a corpus of conversations, the conversation structure model including a fixed number of conversation parts arranged in an ordered sequence having a defined order, such that the conversation parts are constrained to appear in the defined order; and
one or more processors configured to:
deploy the conversation structure model;
input a given conversation comprising words into the conversation structure model; and
enforce the conversation structure model on the given conversation, to output the given conversation as segmented conversation formed segments, the segmented conversation formed segments being created based on analyzing the words from the given conversation, the number of the segmented conversation formed segments corresponding to the fixed number of conversation parts of the conversation structure model, with the segmented conversation formed segments ordered in a sequence corresponding to the ordered sequence of the conversation parts in the conversation structure model,
wherein the conversation structure model is constrained such that each of the conversation parts appears no more than once in the given conversation.

14. The system of claim 13, wherein the one or more processors configured to analyze the words from the given conversation performs the analysis based on word distributions.

15. The system of claim 13, wherein the fixed number of conversation parts arranged in an ordered sequence is obtained from an unsupervised extraction of the conversation parts of the corpus.

16. The system of claim 13, wherein the conversation structure model includes a trained conversation structure model.

17. A system for processing a conversation, the system comprising:
a memory of a computer, the memory configured for storing a conversation structure model;
the conversation structure model having been built based on: 1) collected word occurrence probabilities from conversations in a corpus of conversations to form conversation parts, and 2) collected sequences of conversation parts from the conversations from the corpus of conversations, the conversation structure model being an optimal conversation including a predetermined number of conversation parts, each of the conversation parts arranged in an ordered sequence having a defined order, such that the conversation parts are constrained to appear in the defined order; and
one or more processors configured to:
deploy the conversation structure model;
input a given conversation comprising words into the conversation structure model; and
enforce the conversation structure model on the given conversation to output the given conversation as segmented conversation formed segments, the segmented conversation formed segments being created based on analyzing word distributions of the words from the given conversation, the number of the segmented conversation formed segments corresponding to the number of conversation parts of the conversation structure model, with the segmented conversation formed segments ordered in a sequence corresponding to the ordered sequence of the conversation parts in the conversation structure model,
wherein the conversation structure model is constrained such that each of the conversation parts appears no more than once in the given conversation.

18. The system of claim 17, wherein the number of conversation parts includes a plurality of conversation parts.

19. The system of claim 18, wherein the number of conversation parts includes a fixed number of conversation parts.

20. The system of claim 18, wherein each of the plurality of conversation parts is obtained from an unsupervised extraction of the conversation parts of the corpus and is arranged in the ordered sequence.

21. The system of claim 17, wherein the conversation structure model trained includes a conversation structure model.

* * * * *